United States Patent [19]

Person et al.

[11] Patent Number: 5,321,573
[45] Date of Patent: Jun. 14, 1994

[54] MONOLYTHIC SURGE SUPPRESSOR

[75] Inventors: Herman R. Person; Thomas L. Veik, both of Columbus, Nebr.

[73] Assignee: Dale Electronics, Inc., Columbus, Nebr.

[21] Appl. No.: 914,801

[22] Filed: Jul. 16, 1992

[51] Int. Cl.⁵ .............................................. H02H 9/04
[52] U.S. Cl. ..................................... 361/56; 361/111; 361/127
[58] Field of Search .......................... 361/56, 111, 127

[56] References Cited

U.S. PATENT DOCUMENTS 4,658,153  4/1987  Brosh et al. ......................... 307/106
5,142,430  8/1992  Anthony ............................. 361/111

Primary Examiner—Todd DeBoer
Attorney, Agent, or Firm—Zarley, McKee, Thomte, Voorhees, & Sease

[57] ABSTRACT

A monolythic surge suppressor includes a power source, an inductor coil, and a load in series with one another and in parallel with at least a first varistor. The first varistor and the inductance coil are formed into a single unitary laminated assembly having at least first and second terminations connected thereto. A second varistor can be connected in parallel with the first varistor and is connected to a third termination.

15 Claims, 3 Drawing Sheets

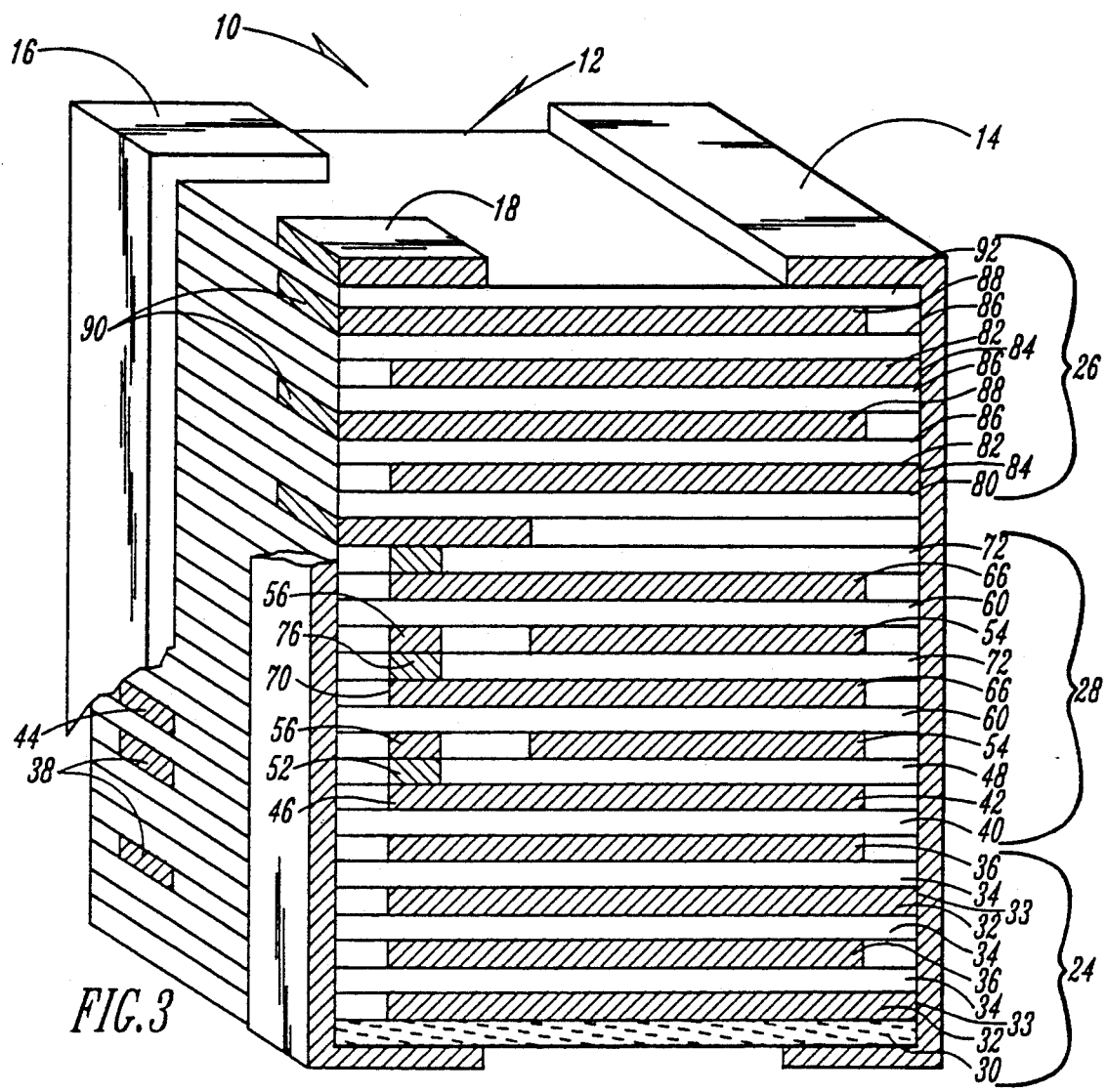
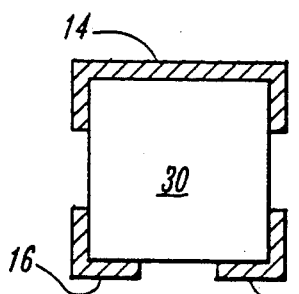
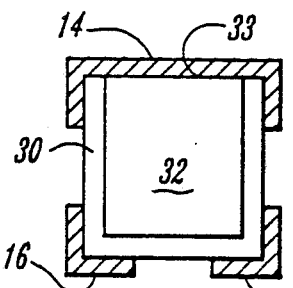
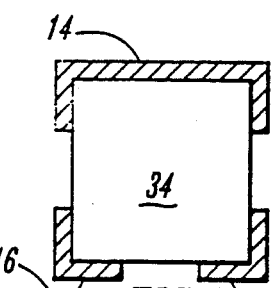
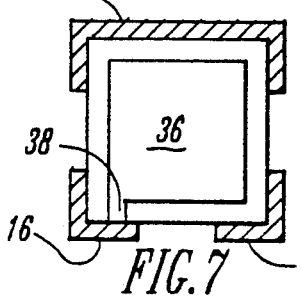
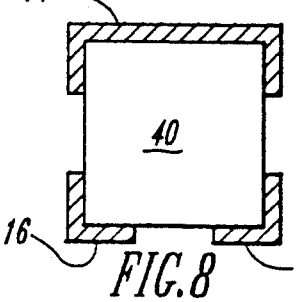
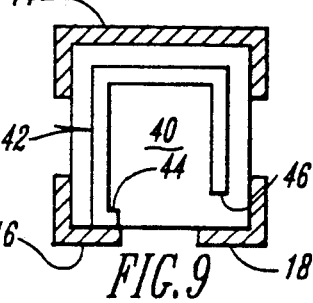

MONOLYTHIC SURGE SUPPRESSOR

BACKGROUND OF THE INVENTION

The present invention relates to a monolythic surge suppressor.

Surge suppressors have been known in the art for protecting sensitive circuits from the damaging effects of voltage surges. These prior surge suppressors contain separate electrical components which include varistors and inductors. These varistors and inductors are usually incorporated as separate components within an electrical circuit.

Therefore, a primary object of the present invention is the provision of an improved surge suppressor.

A further object of the present invention is the provision of a surge suppressor which is miniaturized in comparison to prior art surge suppressors.

A further object of the present invention is the provision of a surge suppressor which is incorporated into a single component rather than separate components as in prior devices.

A further object of the present invention is the provision of a surge suppressor which is surface mountable as a single component.

A further object of the present invention is the provision of a surge suppressor which can be assembled by printing techniques, utilizing a plurality of laminated printed layers.

A further object of the present invention is the provision of a surge suppressor which combines two varistors and an inductor in a single monolythic surface mountable form.

A further object of the present invention is the provision of a varistor which provides flexibility in the manner in which it can be assembled to achieve the desired characteristics of the varistors and the inductor contained within the device.

A further object of the present invention is the provision of a surge suppressor which is economical to manufacture, durable in use, and efficient in operation.

SUMMARY OF THE INVENTION

The foregoing objects are met by a monolythic surge suppressor having an inductor coil assembly and at least one varistor assembly incorporated together into a single laminated structure. The inductor coil assembly comprises a plurality of coil segments sandwiched between pairs of ferrite layers. Conductors extend through via openings in the ferrite layers to form electrical connection between the coil segments.

Stacked with the coil assembly in the monolythic surge suppressor is at least a first varistor assembly comprising one or more layers of varistor material sandwiched between first and second conductor sheets. The varistor material may be a zinc oxide material having one or more semi-conductors therein. A preferred varistor material is manufactured by Raychem Corporation, 300 Constitution Drive, Menlo Park, Calif. 94025, under Model No. 12348-12. Other types of varistor materials are well known in the art and may be purchased from numerous manufacturers.

The monolythic surge suppressor also includes a first terminal or lead which is electrically connected to all of the first conductor sheets on one side of each sheet of varistor material. A second lead or terminal is in electrical contact with one end of the inductor coil assembly and in electrical contact with all of the second conductor sheets on the other side of such sheet of varistor material. A third terminal is connected to the other end of the coil assembly and may be connected to a load.

A second varistor assembly can also be included in the monolythic surge suppressor, and includes at least one layer of varistor material sandwiched between third and fourth conductor sheets. The third lead or terminal is connected to the third conductor sheets in the second varistor assembly and also in electrical contact with one end of the coil. The fourth conductor sheets in the second varistor assembly are in electrical contact with the first lead or terminal.

BRIEF DESCRIPTION OF THE FIGURES OF THE DRAWINGS

FIG. 3 is an enlarged perspective view similar to FIG. 1, but showing the surge suppressor in section as taken along line 3—3 of FIG. 1. For illustrative purposes only substrate 30 and the conductive elements of the invention are cross hatched, even though all surfaces along line 3—3 are in section.

FIGS. 4–23 are plan views of the printed layers in the assembly, showing the terminals in section.

DESCRIPTION OF THE PREFERRED EMBODIMENT

Figure 1:
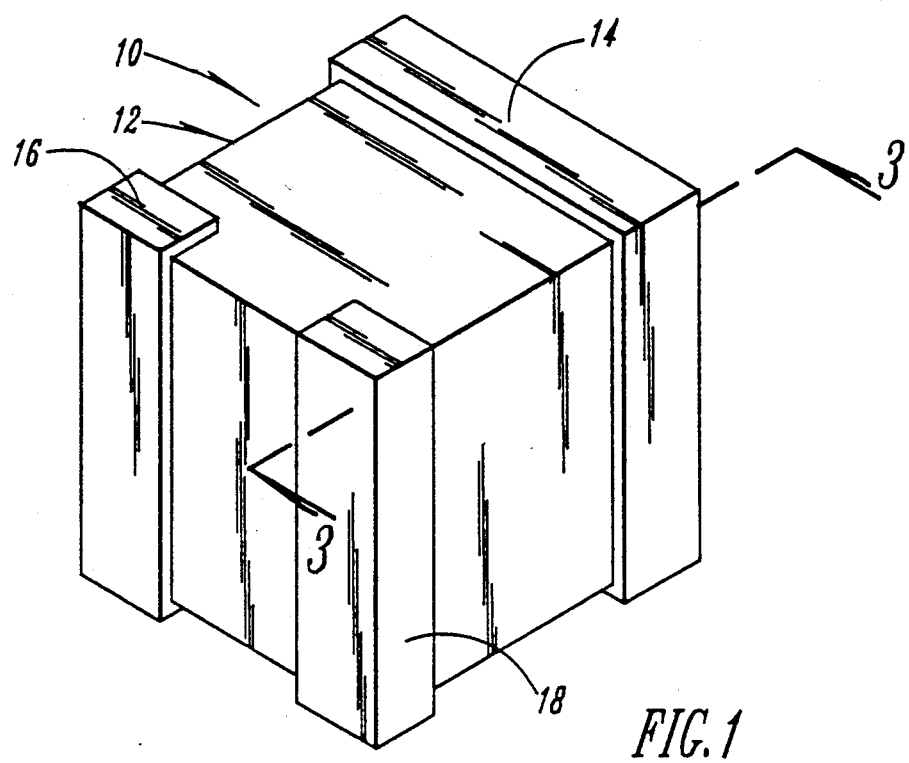
FIG. 1 is a perspective view of the monolythic surge suppressor of the present invention.

Referring to the drawings, the numeral 10 shows a monolythic surge suppressor of the present invention. Surge suppressor 10 comprises a laminated stack 12 having a first termination 14 printed over one end thereof, and having second and third terminations 16, 18 printed over the other end at the corners thereof. Terminations 14, 16, and 18 are printed from ink comprised of a metal conductor, preferably silver. All three of the terminations 14, 16, and 18 are separate from one another and are not in electrical connection with one another.

Figure 2:
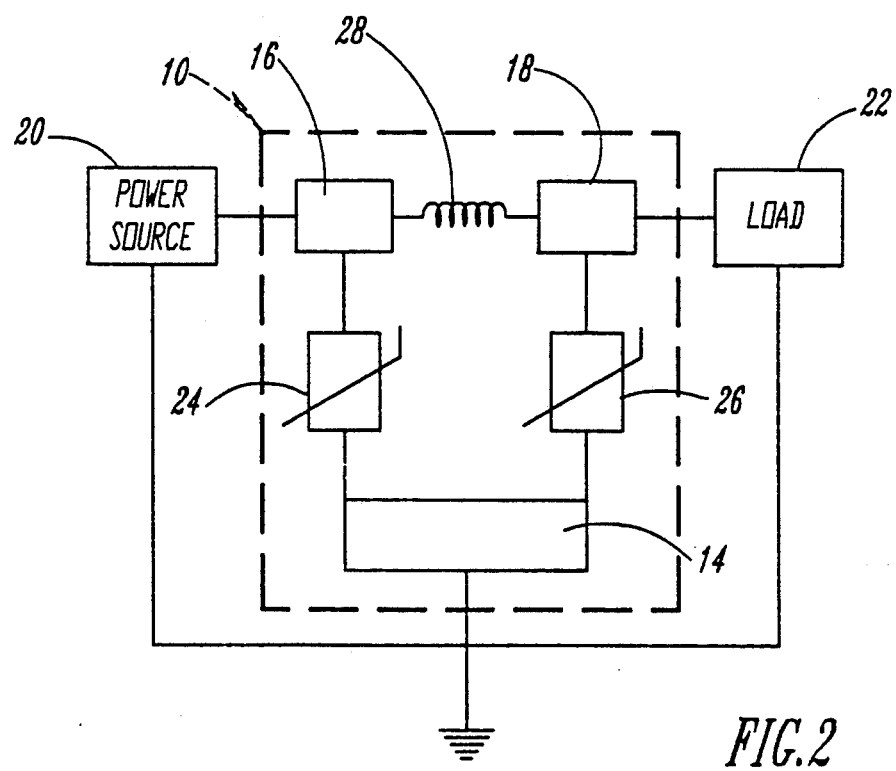
FIG. 2 is a circuit diagram of the surge suppressor in series with a power source and a load.
Figure 10:
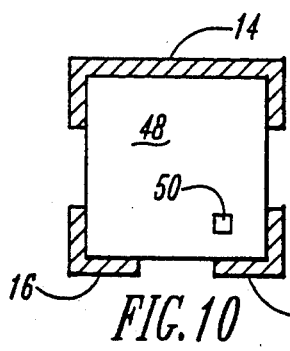
Figure 11:
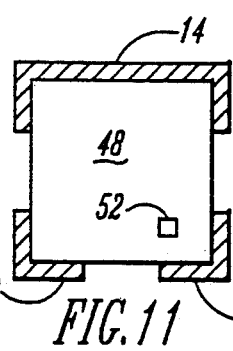

FIG. 2 shows a circuit diagram wherein the surge suppressor 10 is incorporated in series between a power source 20 and a load 22. Load 22 may comprise any electrical circuit which requires protection by the surge suppressor.

The surge suppressor includes a first varistor assembly 24, a second varistor assembly 26, and an inductance coil assembly 28. All of these assemblies are included in the laminated printed layers within laminated stack 12. Their connection to the three terminals 14, 16, and 18, are shown in FIG. 2. During normal operation of the device, the varistors 24, 26 act as insulators, and do not conduct current. Thus, current passes from the power source to first terminal 16, through inductance coil 28, and second terminal 18 to the load 22. When an unusual surge in current occurs, the coil 28 causes a build-up of voltage between the first terminal 16 and ground across the first varistor assembly 24. The varistor assembly 24 reacts to this surge in voltage by becoming a conductor and permitting the shunting of the additional current to ground. In some situations, the entire surge is not shunted off by the first varistor 24, and under these conditions, a voltage drop occurs between second terminal 18 and ground through second varistor 26. This voltage drop causes the second varistor 26 to begin conducting current so as to shunt the remainder of the surge to ground. The first varistor 24 and the second varistor 26 thus combine to protect the circuit load 22 from surges which might occur in the power source.

In prior devices, the inductor coil 28 and the two varistor assemblies 24, 26 were mounted on a circuit board as separate components. The present invention incorporates these into the laminated monolythic surge suppressor 10 shown in FIGS. 1 and 3.

FIGS. 4–7 show the separate printed layers which make up the varistor assembly 24. The numeral 30 designates an insulating wafer which can be constructed of any of a variety of materials such as alumina. Alternatively, it could be replaced with a green tape substrate commonly used in the industry.

Printed over insulative layer 30 is a bottom conductor sheet 32, preferrably comprised of silver. Bottom conductive sheet 32 is spaced inwardly on three of its sides from the outer margins of the insulative layer 30, but its rear connector edge 33 coincides with the rear edge of the insulative layer 30 so that it is in electrical contact with first termination 14. Printed over conductive sheet 32 is a varistor sheet 34. Varistor sheet 34 completely covers conductive sheet 32 and extends to the outer margins of insulative layer 30. The varistor sheet 34 is a varistor material preferably comprised of zinc oxide and containing semi-conductors. The preferred material for the varistor material is a product manufactured by Raychem Corporation having an address of 300 Constitution Drive, Menlo Park, Calif. 94025, under the model designation 12348-12. Printed over varistor sheet 34 is a top conductor sheet 36 having a connector tab 38 which extends into electrical contact with the second termination or terminal 16. The remainder of conductive sheet 36 is spaced inwardly from the margins of insulative layer 30, and is spaced from and out of electrical contact with the terminals 14, 18. While the terminals 14, 16, 18 are shown in FIGS. 4–23, in the normal manufacturing process, the terminals are added after the various layers are printed. The terminals are shown in FIGS. 4–23 in order to show the inter-relationships between the various laminated layers and the terminals 14, 16, and 18.

The layers 32, 34, 36 may be repeated several times in order to achieve the desired characteristics for varistor 24. Referring to FIG. 3, these layers are shown repeated several times with the varistor layers 34 being sandwiched alternatively between the conductive layers 32, 36. The number of layers can be increased or decreased to affect the electrical properties of the varistor 24. By increasing the number of layers, the plate area, and thus the current carrying capability of the varistor 24 will be increased.

Stacked above the varistor 24 are a plurality of laminations which comprise the inductor coil assembly 28. The details of these printings are shown in FIGS. 8–18. Initially a ferrite layer 40 is printed over the top of varistor 24. Next, a first coil segment 42 is printed over ferrite sheet 40. Coil 42 includes an input end 44 which is in electrical contact with the second termination 16 and which includes an output end 46. Printed over first coil segment 42 is a ferrite sheet 48 having a via way 50 therein which is positioned in registered alignment over the output end 46 of first coil segment 42. A via filler conductor 52 is printed over the via opening 50 and fills the opening so as to form electrical connection with the outlet end 46 of first coil segment 42.

Figure 12:
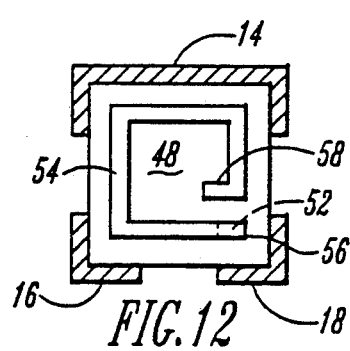
Figure 13:
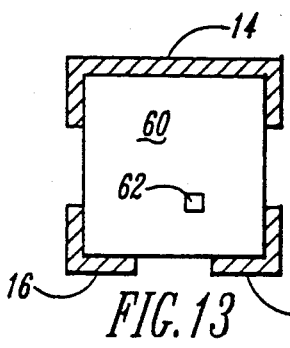
Figure 14:
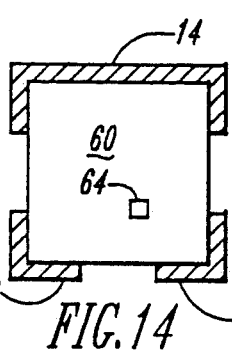
Figure 15:
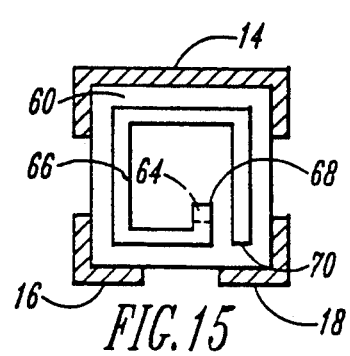
Figure 16:
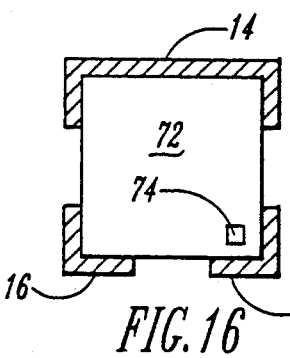

FIG. 12 illustrates a second coil segment 54 which is printed over ferrite layer 48 and which includes an input end 56 registered with an electrical contact with the filler conductor 52 so as to provide electrical continuity with the output end 46 of first coil segment 42. Second coil segment 54 includes an output end 58.

Figure 18:
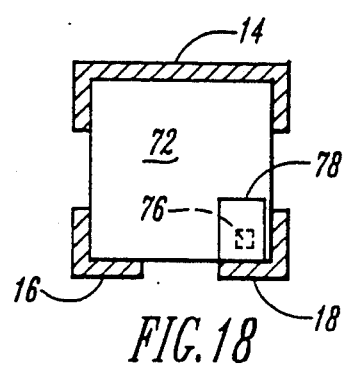
Figure 19:
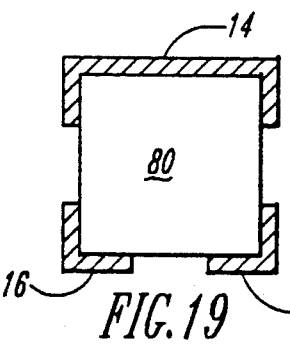
Figure 20:
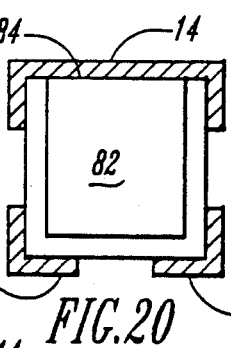
Figure 21:
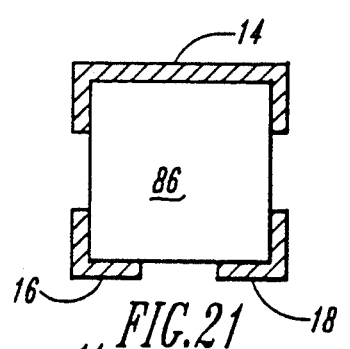
Figure 22:
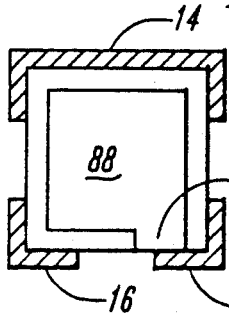
Figure 23:
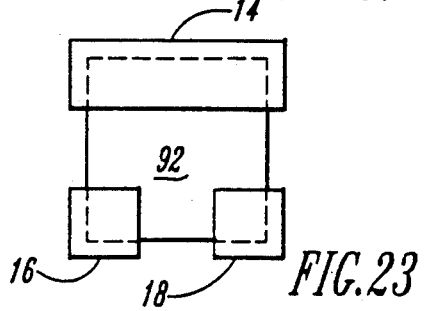

Another ferrite layer 60 is printed over the second coil segment 54 and includes a via opening 62 registered above the outlet end 58 of second coil segment 54. A via filler conductor 64 is printed over via opening 62 and fills the opening to provide electrical continuity with the output end 58 of second coil conductor 54. Printed over the ferrite layer 60 is a third coil segment 66 which includes an input end 68 registered with and in an electrical contact with the via filler conductor 64. Third coil segment 66 also includes an output end 70. Another ferrite layer 72 is printed over third coil segment 66 and includes a via opening 74 registered with the output end 70 of third coil conductor 66. A via filler conductor 76 is printed within via opening 74. Printed over the via filler conductor 76 is a conductor plate 78 which extends into electrical contact with the third termination 18. Thus, electrical continuity is provided from second termination 16 (FIG. 9) through the three coil segments 42, 54, 66 in a clockwise fashion to the third termination 18 (FIG. 18). This arrangement is also shown schematically in FIG. 2 wherein the inductor coil 28 is connected in series between second termination 16 and third termination 18.

FIGS. 19 through 22 show the layers which are printed to construct the second varistor 26. These layers are also shown in FIG. 3. The initial layer is an insulative layer 80 which may be comprised of ferrite, or other insulative material. Printed over insulative layer 80 is a bottom conductor sheet 82 which is spaced inwardly from three of the margins of the insulative layer 80, but which includes a connector edge 84 which is in electrical contact with the first termination 14. Printed over bottom conductor sheet 82 is a varistor layer 86, and printed over the varistor layer 86 is a top conductive sheet 88 having a connector tab 90 which is in electrical contact with termination 18. Again, as with varistor 24, numerous repetitions of the layers 82, 86, 88 may be made in order to achieve the desired characteristics for the varistor 26. After the desired number of repetitive printings have been made, an insulative layer 92 is printed over the top.

The terminations 14, 16, and 18 are added after the entire laminated assembly has been printed. These terminations may be made of silver or other suitable conductors.

The various layers shown in FIGS. 4 through 23 are printed by screen printing methods well known in the art. The thicknesses of each print are on the order of from 25 to 30 microns in thickness. In some cases, several layers of thick film prints are required to build up the desired thickness. This is particularly true with respect to the prints of varistor material 34 (FIG. 6) and 86 in FIG. 21. The number of layers printed and hence the material thickness can be varied to control the threshold voltage at which the varistor begins to conduct.

The ferrite layers 40, 48, 60, and 72 also each require more than a single print in order to prevent shorting between the conductors on their opposite faces. Several printings of each layer should be made in order to prevent the shorting between the conductors. Similarly, the insulative layer 80 and insulative layer 92 should each be comprised of several prints.

The various conductive materials in the lamination however generally require only a single printing. This is true for the conductive sheets 32, 36 shown in FIGS. 5 and 7, the conductive coils 42, 54, 66, the conductive fillers 52, 64, 76, and the conductive plate 78. Similarly, the conductive sheets 82, 88 will require only a single printing.

The number of repeated layers shown in FIG. 3 is believed to be nearly the minimum number of layers necessary for a three component device. The number of layers can be increased to affect the electrical properties of the varistors 24, 26 and the inductor 28. Repeating the layers 32, 34, 36 or 82, 86, 88 increases the corresponding plate area of the varistors 24, 26 respectively, and thus increases the current carrying capability of these varistors.

The same can be said for the inductance coil segments 42, 54, 66. These may be repeated as many as desired in order to achieve the inductance value of the component.

Figure 17:
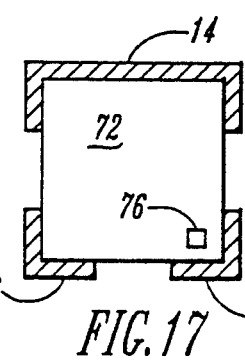

It should be noted that the connector plate 78 (FIG. 18) is large enough to cover either the filler conductor 64 (FIG. 14) or the filler conductor 76 (FIG. 17). This permits flexibility in the number of coil segments 42, 54, 66 which are included in the inductance coil. The number of coils can stop with either coil segment 54 or with coil segment 66 depending upon the desired inductance value required. In either case, the connector plate 78 will make contact with the output end of the final coil.

After the laminations of FIGS. 4-22 are completed, the solder terminations 14, 16, and 18 are printed as shown in FIG. 1. Upon completion of the printing process, the entire structure of the surge suppressor 10 is still in its green state and must be fired before completion.

The present invention results in a single part. However, efficiencies in manufacture can be improved by simultaneously printing of hundreds or even thousands of parts into a wafer. The resulting wafer after being fired can then be diced into individual parts with the solder terminations 14, 16, and 18 being applied after the dicing.

The preferred embodiment of the present invention includes a single inductor 28 and two varistors 24, 26. These three components are connected in a "PI" arrangement. The varistor 24 represents a first line of defense against a surge eminating from power source 20. It will remove a major portion of a voltage surge by clamping that voltage at the varistors clamping voltage level. However, because of the impedence characteristics of the varistor, it generally will not remove all of the surge. The remaining portion of the voltage surge will be conducted through inductor 28 to varistor 26.

As the voltage increases to the clamping voltage of varistor 26, the current is shunted through the varistor. The high rise of current passing through inductor 28, causes the impedence of inductor 28 to increase, effectively limiting the current of the voltage source to a minimum value.

The invention can be simplified if desired by changing the device to a two component device including a single varistor and a single inductance coil.

The terminations 14, 16, and 18 provide flexibility for the component and permit the component to be surface mounted on a circuit board.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

We claim:

1. A monolythic surge suppressor comprising:
   an inductor coil assembly comprising a plurality of coil segments, each being sandwiched between a plurality of ferrite layers, a plurality of connector means extending through said ferrite layers to interconnect said coil segments in series with one another to create a continuous coil means having first and second ends;
   a first varistor assembly comprising at least one layer of varistor material sandwiched between a first conductor sheet and a second conductor sheet;
   said inductor coil assembly and said varistor assembly being stacked one above the other to form a single laminated assembly;
   first lead means attached, to said laminated assembly and being in electrical connection with said first conductor sheet of said varistor assembly;
   second lead means attached to said laminated assembly and being in electrical connection with said first end of said coil means and in electrical connection with said second conductor sheet of said varistor assembly.

2. A monolythic surge suppressor according to claim 1 comprising a second varistor assembly stacked within said single laminated assembly and comprising at least one layer of varistor material sandwiched between a third conductor sheet and a forth conductor sheet, third lead means being connected to said third conductor sheet and being in electrical contact with said second end of said coil means; said fourth conductor sheet being in electrical contact with said first lead means.

3. A monolythic surge suppressor according to claim 2 wherein said coil assembly is stacked between said first varistor assembly and said second varistor assembly.

4. A monolythic surge suppressor according to claim 3, said first varistor assembly comprises a plurality of layers of said varistor material and a plurality of said first and second conductor sheets, each of said layers of said varistor material being sandwiched between one of said first conductor sheets and one of said second conductor sheets.

5. A monolythic surge arrestor according to claim 4 wherein each of said first conductor sheets in said first varistor assembly is in electrical contact with said first lead means and each of said second conductor sheets of said first varistor assembly is in electrical contact with said second lead means.

6. A monolythic surge arrestor according to claim 1 wherein said ferrite layers of said inductor coil assembly each include perimetric edges forming a first predetermined shape, said layers of varistor material in said first varistor assembly also having perimetric edge forming said first predetermined shape and being stacked in registered alignment with said ferrite layers of said inductor coil assembly.

7. A monolythic surge arrestor according to claim 6 wherein said first and second ends of said coil means include first and second exposed portions, respectively, adjacent and between said perimetric edges of said ferrite layers, said first conductor sheet and said second conductor sheet having first and second tab means respectively exposed adjacent and between said perimetric edges of said layers of varistor material of said first varistor assembly.

8. A monolythic surge arrestor according to claim 7 wherein said first lead means is in electrical contact with said first tab means of said first conductor sheet and said second lead means is in electrical contact with said first exposed portion of said first end of said coil means and in electrical contact with said second tab means of said second conductor sheet.

9. A monolythic surge arrestor according to claim 1 wherein said single laminated assembly includes first and second opposite ends, said first lead means being attached to said first end of said single laminated assembly and said second lead means being attached to said second end of said single laminated assembly, said first and second lead means being out of electrical connection with each other.

10. A monolythic surge arrestor according to claim 2 wherein said single laminated assembly includes first and second opposite ends, said first lead means being attached to said first end of said single laminated assembly, said second and third lead means being attached to said second end of said single laminated assembly, said first, second, and third lead means being out of direct electrical connection to each other.

11. A monolythic surge suppressor for connection between a power source and a load, said surge suppressor comprising:
    an inductance coil assembly and a first varistor assembly stacked one above another to form a single laminated assembly;
    a first termination attached to said laminated assembly and being adapted for electrical connection to ground;
    a second termination attached to said laminated assembly and being adapted for electrical connection to said power source;
    a third termination attached to said laminated assembly and being adapted for connection to said load;
    said inductance coil assembly being electrically connected in series with and between said second and third terminations;
    said first thermistor assembly being electrically connected in series with and between said first and second terminations.

12. A monolythic surge suppressor according to claim 11 wherein a second thermistor is stacked in said single laminated assembly, said second thermistor being electrically connected in series with and between said first and third terminations.

13. A monolythic surge suppressor according to claim 11 wherein said inductor coil assembly comprises a plurality of coil segments, each being sandwiched between a plurality of non conductive layers and being interconnected to create a continuous coil having first and second ends.

14. A monolythic surge suppressor according to claim 11 wherein said first varistor comprises at least one layer of varistor material sandwiched between a first conductor sheet and a second conductor sheet.

15. A monolythic surge suppressor according to claim 11 wherein said single laminated assembly includes first and second opposite ends, said first termination being attached to said first end of said single laminated assembly, said second and third terminations being attached to said second end of said single laminated assembly, said first, second, and third terminations being out of direct electrical connection to each other.

* * * * *